June 24, 1930.  R. H. WORCESTER  1,765,959
SAFETY COUPLER
Filed March 1, 1927
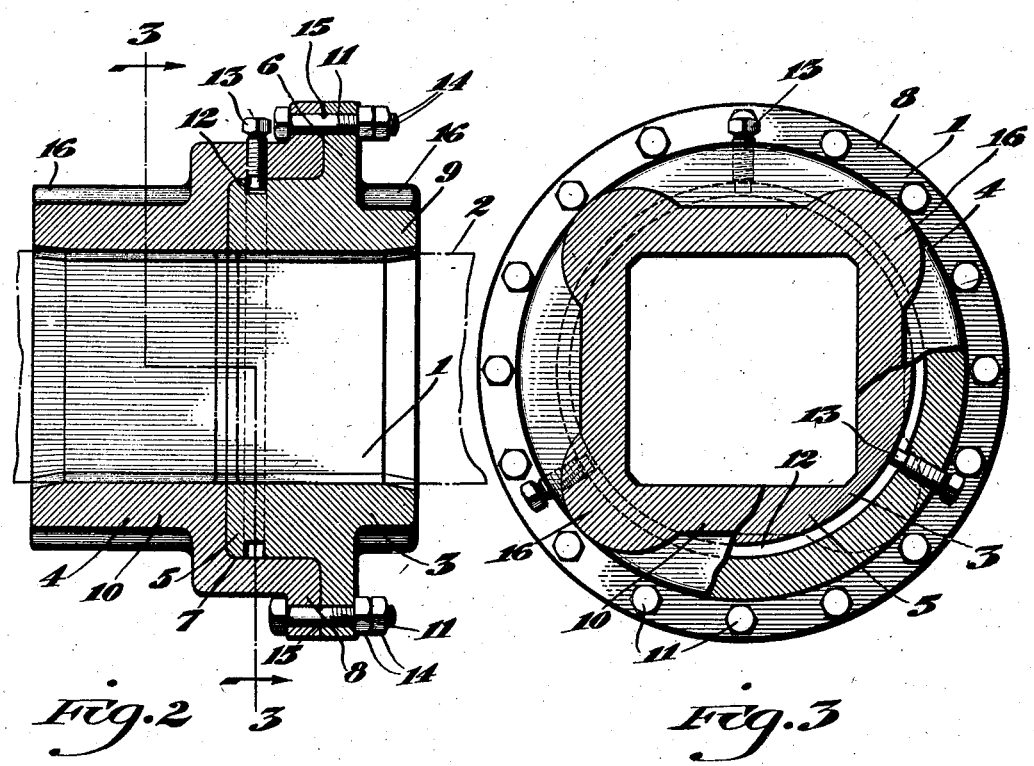
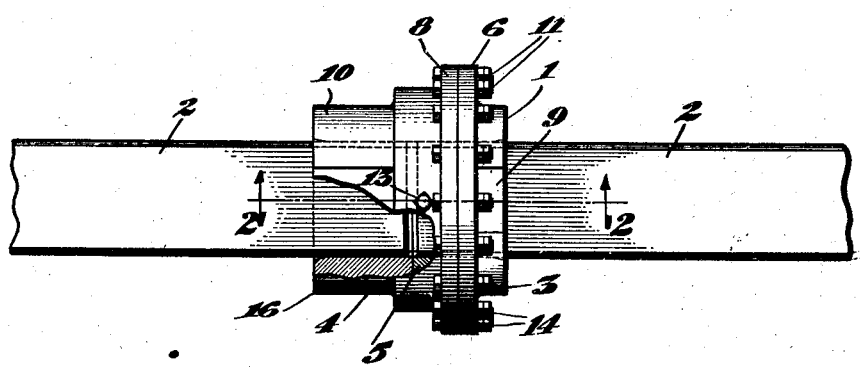
Inventor
Richard H. Worcester
By Ward & Ward
Attorneys Patented June 24, 1930

1,765,959

UNITED STATES PATENT OFFICE

RICHARD H. WORCESTER, OF HONOLULU, TERRITORY OF HAWAII

SAFETY COUPLER

Application filed March 1, 1927. Serial No. 171,887.

This invention relates to improvements in couplings and is particularly directed to a safety coupling inserted in a line of power shafting as a driving connector breakable under undue load to render the shaft inoperative for conveying power.

In the operation of heavy machinery, as grinding mills and the like, it frequently occurs that strains and loads are thrown upon the machinery beyond its capacity, and therefore to avoid injury the driving shaft is made in sections and the sections rotatively connected together by couplings breakable under overload. The breaking of the coupling disjoints the power shaft and the power is thus cut off to the machine and no damage thereto can result.

The difficulty is, however, that as the shaft connector parts moving at great velocity, are shattered and the shafting sections dismounted the loosened parts are apt to be thrown about, creating a considerable hazard.

It is therefore an object of this invention to provide a safety device as a shaft coupler in which certain minor parts will break under overload thereby disconnecting the shafting sections as to rotation but in which the coupler parts and shaft sections are otherwise maintained axially aligned and in their relative mounted positions, thereby preventing any disastrous effects which would occur through the dismounting of the shaft ends.

Another object is to provide a safety coupler composed of two major companion parts respectively secured to the ends of the shaft sections which they connect, these parts normally rotatively bound together by minor inexpensive parts to connect the shafting as a unit, but held journaled or nested upon each other so as to be rotatable irrelatively after the minor parts have been broken as a result of undue load created in the mechanism operated thereby.

Still another object is to provide a safety coupler of this nature in which the parts adapted to be broken by overload are inexpensive and easily replaced without taking down the line of shafting and in which the principal coupler parts are suitably ribbed and strengthened so as to give durability to a coupler functioning under great driving strains.

Further objects and advantages will be more fully set forth in the description of the accompanying drawings forming a part of this specification, in which:

Figure 1 is a view of a portion of a line of shafting showing the improved safety coupler joining sections of shafting together.

Figure 2 is a sectional view taken on line 2—2, Figure 1, detailing the mounting of the coupler parts and showing the means by which these parts of the coupler are rotatably joined together so as to be broken apart under heavy or undue load and also showing the means of maintaining these parts in their journaled relation after severance of the driving connection.

Figure 3 is a sectional view taken on line 3—3, Figure 2, further illustrating the coupler in detail.

Referring to Figure 1 of the drawings, the improved coupler is indicated generally as at 1. A power shaft is shown and comprises sections 2—2 which are joined by the coupler to form a normally unitarily rotatable driving shaft. The particular mechanism being driven and the power unit mounted at the respective ends of the power shaft are not shown since this type of coupler has application to any power shaft. The coupler is composed of the flanged companion members 3 and 4, having central bores and secured to the ends of the shaft sections which they rotatively connect as an assembled coupler. Fastening of the coupler parts to the shaft section may be accomplished in various ways, as by making them a drive fit on the shaft ends, by shrinking them thereon, or by a pair of spacer collars (not shown) secured to the shaft sections at each side of the coupler. The particular shaft shown herein is squared but it is readily seen that the shaft may be of any shape, as rectangular or round.

The companion coupler parts 3 and 4 are journaled one upon the other for rotation irrelatively. Part 3 has a circular hub 5 extending out from one side of a circular flange 6, and correspondingly, a depression 7 is formed in the opposing side of the part 4, the circular hub 5 being adapted to fit snugly within this depression. The part 4 has a flange 8 formed at its inner end corresponding in dimension to the flange 6 of the companion coupler part 3 so as to fit uniformly thereagainst. The coupler part 3 is thus telescopically engaged or nested into the companion part 4 so that the coupler parts are journaled for rotation upon each other. Normally, however, they are intended to rotate as a unit and it is only under abnormal conditions that this irrelative rotation takes place.

The outer ends of the coupler members 3 and 4 are respectively provided with the square ribbed hubs 9 and 10. The flanges 6 and 8 of the respective coupler elements are held together by means of a series of bolts 11 spaced around and traversing the flanges. These bolts, broadly speaking, are the only driving connection between the power source and the mechanism driven by the power shaft, since they are the rotative connection between the shaft sections or coupler parts. If the driving strain created in the driven mechanism is too great, the bolts are broken off and the coupler parts are rotatable independent of each other.

In order that the coupler parts 3 and 4 may be held together against longitudinal displacement relative to each other and in axial alignment, in the event of the breakage of the bolts 11, means for maintaining this relation is provided independent of the bolts 11. A continuous annular groove 12 is provided in the periphery of the circular hub 5. A plurality of radially disposed screws 13 are engaged through the walls of the part 4 adjacent the depression therein and the point of these screws engage into the groove 12. This relation of the screws to the groove allows independent rotation of the coupler parts but prevents separation longitudinally.

As the bolts 11 are broken off, due to the strains of driving an overloaded mechanism, the power stops between the coupler parts. One part rotates idly upon the other and the normally driven side of the unit is dormant. Thereupon, the radial screws become operative for maintaining the parts together in their axially aligned telescopic relation. The bolts 11 are secured together by pairs of nuts 14 and are notched as at 15 at the point of breakage, that is, immediately at the point of juncture of the flanges. The depth of the notches 15 is dependent upon the strength required in the bolts to maintain the drive at normal driving strains. In order to strengthen the coupler parts against the peculiar strains imposed by a squared shaft, the longitudinal ribs 16 are formed at the corners of each of the squared hubs to thicken and strengthen the coupler parts at these points of strain.

Having described my invention, I claim:

A device of the class described, comprising, a sectional driving shaft, companion coupler members each having a central bore for insertion of and rotative connection to the adjoining ends of the shaft sections, adjoining peripheral flanges formed on said coupler members, a series of fastening elements traversing said flanges and rotatably binding the coupler members together, said fastening elements weakened along the line of the adjoining faces of the flanges, one of said coupler members having a bearing portion extending into the second, journalling the members together for relative rotation, said bearing member having an annular groove therein and radially disposed screws in the second member entering said groove, thereby preventing longitudinal displacement of the members in the event of breakage of the rotative connection between the members.

In witness whereof, I hereunto subscribe my name.

RICHARD H. WORCESTER.